United States Patent
Fukutomi et al.

(10) Patent No.: US 9,957,858 B2
(45) Date of Patent: May 1, 2018

(54) OIL DETERIORATION SUPPRESSING APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Ippei Fukutomi, Machida (JP); Motoichi Murakami, Gotenba (JP); Norio Inami, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 54 days.

(21) Appl. No.: 14/805,735

(22) Filed: Jul. 22, 2015

(65) Prior Publication Data

US 2016/0024982 A1   Jan. 28, 2016

(30) Foreign Application Priority Data

Jul. 23, 2014 (JP) .................. 2014-149714

(51) Int. Cl.
  *F01M 1/10*   (2006.01)
  *B01D 39/20*   (2006.01)
(52) U.S. Cl.
  CPC .......... F01M 1/10 (2013.01); B01D 39/2068 (2013.01); *B01D 2239/065* (2013.01); *F01M 2001/1014* (2013.01); *F01M 2001/1057* (2013.01)
(58) Field of Classification Search
  CPC ...... C10M 2201/103; C10M 2201/105; F01M 11/03; F01M 1/10; F01M 2001/1057; F01M 2013/0438
  USPC ..................................... 123/196 R
  See application file for complete search history.

(56) References Cited

U.S. PATENT DOCUMENTS

| 4,655,914 | A | | 4/1987 | Wada | |
|---|---|---|---|---|---|
| 5,548,393 | A | * | 8/1996 | Nozawa | F01M 11/10 340/631 |
| 5,950,591 | A | * | 9/1999 | Kageyama | C10M 175/0091 123/196 A |
| 6,938,605 | B2 | * | 9/2005 | Al-Khateeb | F01M 5/002 123/196 AB |
| 8,887,689 | B2 | * | 11/2014 | Harada | F01M 1/10 123/196 A |
| 2008/0283019 | A1 | | 11/2008 | Arakawa et al. | |
| 2009/0071913 | A1 | | 3/2009 | Konig et al. | |
| 2009/0255498 | A1 | | 11/2009 | Saito | |
| 2010/0078371 | A1 | | 4/2010 | Saito | |
| 2012/0312731 | A1 | | 12/2012 | Ohmiya et al. | |

(Continued)

FOREIGN PATENT DOCUMENTS

| CN | 1789676 A | 6/2006 |
|---|---|---|
| EP | 1184066 A1 | 3/2002 |

(Continued)

*Primary Examiner* — Long T Tran
(74) *Attorney, Agent, or Firm* — Andrews Kurth Kenyon LLP

(57) ABSTRACT

An oil deterioration suppressing apparatus for an internal combustion engine comprises a first oil filter and a second oil filter, wherein the first oil filter comprises a first filter member for filtering oil from an oil pan in which oil is stored, and the second oil filter comprises a second filter member for filtering oil from the oil pan, and wherein the second filter member is made of a ceramic material and has a mean pore size smaller than the mean pore size of the first filter member.

10 Claims, 5 Drawing Sheets

(56) References Cited

U.S. PATENT DOCUMENTS

| | | | | |
|---|---|---|---|---|
| 2013/0292318 A1* | 11/2013 | Morishita | .............. | B01D 24/02 210/291 |
| 2013/0340705 A1* | 12/2013 | Harada | ................... | F01M 1/10 123/196 A |
| 2014/0001108 A1* | 1/2014 | Fukutomi | ................ | F01M 1/10 210/167.04 |

FOREIGN PATENT DOCUMENTS

| | | |
|---|---|---|
| EP | 1731726 A2 | 12/2006 |
| GB | 2418873 A | 4/2006 |
| JP | S59-61814 U | 4/1984 |
| JP | H06073304 U | 10/1994 |
| JP | 2006-263517 A | 10/2006 |
| JP | 2008280986 A | 11/2008 |
| JP | 2008540123 A | 11/2008 |
| JP | 2009-074548 A | 4/2009 |
| JP | 2009257136 A | 11/2009 |
| JP | 201084533 A | 4/2010 |
| WO | 2005088084 A1 | 9/2005 |
| WO | 2006/127652 A2 | 11/2006 |
| WO | 2011/093519 A1 | 8/2011 |

\* cited by examiner

OIL DETERIORATION SUPPRESSING APPARATUS FOR INTERNAL COMBUSTION ENGINE

CROSS-REFERENCE TO RELATED APPLICATION

The present application claims priority to Japanese Patent Application No. 2014-149714 filed on Jul. 23, 2014, which is incorporated herein by reference in its entirety.

TECHNICAL FIELD

The present invention relates to an oil deterioration suppressing apparatus for an internal combustion engine to suppress deterioration of oil, which is used in the internal combustion engine.

BACKGROUND ART

In the past, engine oil has been used to lubricate and cool an internal combustion engine (below, also referred to as an "engine"). For example, the engine oil is stored in an oil pan provided under the engine and is fed to the different parts of the engine by an oil pump. The engine oil circulated through the engine parts contains foreign matter such as impurities. In general, to remove this foreign matter, an oil filter has been provided in the oil path into which the engine oil flows.

As such an oil filter, a spin-on type or cartridge type oil filter comprising a filter member made of a filter paper etc., housed in a casing is generally known. The filter member generally has a pore size of about 18 μm. Therefore, in a conventional oil filter, while it was possible to remove relatively large foreign matter, for example, foreign matter such as abrasion dust, there was the problem that smaller foreign matter, for example, foreign matter such as soot ingredients (burned hydrocarbons and oxide products) or sludge ingredients could not be sufficiently removed. Such foreign matter led to deterioration of the oil and in turn sometimes had various detrimental effects on the different engine parts.

Patent Document 1 describes a filtration medium for filtering a lubricant oil comprising a thermally bonded sheet, the sheet comprising (a) about 1 to 40 wt % of a bicomponent binder fiber having a fiber diameter of about 5 to 15 micrometers and a fiber length of about 0.1 to 15 cm; and (b) about 60 to 99 wt % of a glass fiber having a fiber diameter of about 0.1 to 5 micrometers and an aspect ratio of about 10 to 10,000; wherein the media has a thickness of about 0.2 to 2 mm, a solidity of about 2 to 10%, a basis weight of about 10 to 50 g·m$^{-2}$, a pore size of about 0.5 to 10 micrometers and a permeability of about 0.03 to 9.1 m·min$^{-1}$ (0.1 to 30 ft·min$^{-1}$).

In technical fields different from the above oil filter for an internal combustion engine, for example, various filtration membranes and production methods thereof have been proposed as described below.

Patent Document 2 describes a hollow-fiber porous membrane of vinylidene fluoride resin, comprising a porous membrane of vinylidene fluoride resin in a hollow-fiber form; and having a ratio Pmax/Pm of at most 2.0 between a maximum pore size Pmax and an average pore size Pm, and a Pm of 0.13 μm-0.25 μm, according to the half-dry/bubble point method (ASTM F316 and ASTM E1294); a coefficient of variation in outer surface pore size of at most 70%, and a porosity of 75-90%. Further, Patent Document 2 describes that such a hollow-fiber porous membrane of vinylidene fluoride resin shows excellent water-permeability maintenance power in continuous filtration of cloudy water.

Patent Document 3 describes a method of producing a multilayered structure ceramic filter comprising continuously depositing a slurry for forming different layers of a first layer to an n-th layer on the surface of a porous substrate by a cross-flow filtration method, drying the porous substrate after depositing the slurry for forming the different layers of the first layer to the n-th layer, and firing the dried porous substrate.

PRIOR ART DOCUMENTS

Patent Documents

Patent Document 1: JP 2013-240796A
Patent Document 2: WO 2010/082437A
Patent Document 3: JP 2009-219961A

SUMMARY OF THE INVENTION

Problems to be Solved by the Invention

In a filter material comprised of fiber such as described in Patent Document 1 or a filter material comprised of a hollow-fiber porous membrane made of a resin such as described in Patent Document 2, there is large variation in pore size with generally a normal distribution with a large dispersion. Further, in these filter materials, the pore size may change due to heat expansion etc., of the component materials. Therefore, even if these filter materials are used in filtering engine oil, it is difficult to reliably remove the fine foreign matter contained in the engine oil.

Therefore, an object of the present invention is to provide a novel oil deterioration suppressing apparatus for an internal combustion engine which can remove relatively large foreign matter such as abrasion dust and can reliably remove relatively small foreign matter which cannot be sufficiently removed by a conventional oil filter, in particular foreign matter such as soot ingredients and sludge ingredients, without being greatly affected by temperature.

Means For Solving The Problems

The present invention for attaining this object is as follows.

(1) An oil deterioration suppressing apparatus for an internal combustion engine, comprising a first oil filter and a second oil filter, wherein the first oil filter comprises a first filter member for filtering oil from an oil pan in which oil is stored, and the second oil filter comprises a second filter member for filtering oil from the oil pan, and wherein the second filter member is made of a ceramic material and has a mean pore size smaller than the mean pore size of the first filter member.

(2) The oil deterioration suppressing apparatus for an internal combustion engine as described in item (1), wherein the first filter member is made of a material different from a ceramic material.

(3) The oil deterioration suppressing apparatus for an internal combustion engine as described in item (1) or (2), wherein the second filter member has a mean pore size of greater than 0.1 μm but less than 1 μm.

(4) The oil deterioration suppressing apparatus for an internal combustion engine as described in item (3), wherein the second filter member has a mean pore size of 0.2 μm or more but 0.5 μm or less.

(5) The oil deterioration suppressing apparatus for an internal combustion engine as described in any one of items (1) to (4), wherein the first oil filter is a full flow filter which is connected to a downstream side of the oil pan in oil flow and an upstream side of lubricated parts of the internal combustion engine in oil flow and which filters the oil supplied to the lubricated parts of the internal combustion engine, and wherein the oil deterioration suppressing apparatus has a bypass route which is branched off at an upstream side or downstream side of the first oil filter in the oil flow direction and communicates with the oil pan, and the second oil filter is a bypass filter which is placed in the bypass route and filters the oil toward the oil pan.

(6) The oil deterioration suppressing apparatus for an internal combustion engine as described in item (5), wherein the oil deterioration suppressing apparatus has a bypass route which is branched off at a downstream side of the first oil filter in the oil flow direction and communicates with the oil pan.

(7) The oil deterioration suppressing apparatus for an internal combustion engine as described in any one of items (1) to (6), wherein the second oil filter is comprised of a honeycomb structure wherein the honeycomb structure comprises a plurality of cell passages which are defined by partition walls and which oil flows into, and is made of a ceramic material, and wherein the partition walls comprise the second filter member.

(8) The oil deterioration suppressing apparatus for an internal combustion engine as described in item (7), wherein the partition walls have a multilayer structure, and the second filter member forms a surface layer of the multilayer structure at the oil inflow side.

(9) The oil deterioration suppressing apparatus for an internal combustion engine as described in item (8), wherein the mean pore sizes of the layers of the multilayer structure gradually increase from an oil inflow side toward an oil outflow side of the multilayer structure.

(10) The oil deterioration suppressing apparatus for an internal combustion as described in any one of items (1) to (9), wherein the ceramic material which forms the second filter member or the honeycomb structure is selected from the group consisting of cordierite, silicon carbide, alumina, zirconia, titania, and combinations thereof.

(11) The oil deterioration suppressing apparatus for an internal combustion engine as described in any one of items (1) to (10), wherein the first filter member consists of a filter paper or a nonwoven fabric.

Effect Of The Invention

According to the oil deterioration suppressing apparatus for an internal combustion engine of the present invention, by using, in addition to a conventional oil filter (a first oil filter), an additional oil filter (a second oil filter) comprising a second filter member made of a ceramic material which has a much smaller coefficient of heat expansion compared with materials such as resins and which is relatively easy to control in pore size wherein the second filter member has a mean pore size smaller than the mean pore size of the first filter member in the conventional oil filter, it is possible to reliably remove relatively small foreign matter, in particular foreign matter such as soot ingredients, which could not be sufficiently removed by the conventional oil filter, without being greatly affected by temperature, and therefore possible to remarkably suppress deterioration of the oil used in an internal combustion engine. Further, by controlling the mean pore size of the second filter member to a specific range, for example, a range of greater than 0.1 µm but less than 1 µm, in particular 0.2 µm or more but 0.5 µm or less, it is possible to pass additive ingredients such as the viscosity index improver through the second oil filter, while selectively removing foreign matter such as the abrasion dust or soot ingredients. Furthermore, by using the second oil filter, not only is it possible to suppress deterioration of the oil, but the second oil filter can maintain the performance in removing soot ingredients, etc., even for oil which has deteriorated to a certain advanced stage, and therefore can exhibit high durability.

MODE FOR CARRYING OUT THE INVENTION

<Oil Deterioration Suppressing Apparatus for Internal Combustion Engine>

An oil deterioration suppressing apparatus for an internal combustion engine of the present invention comprises a first oil filter and a second oil filter, wherein the first oil filter comprises a first filter member for filtering oil from an oil pan in which oil is stored, and the second oil filter comprises a second filter member for filtering oil from the oil pan, and wherein the second filter member is made of a ceramic material and has a mean pore size smaller than the mean pore size of the first filter member.

Figure 1:
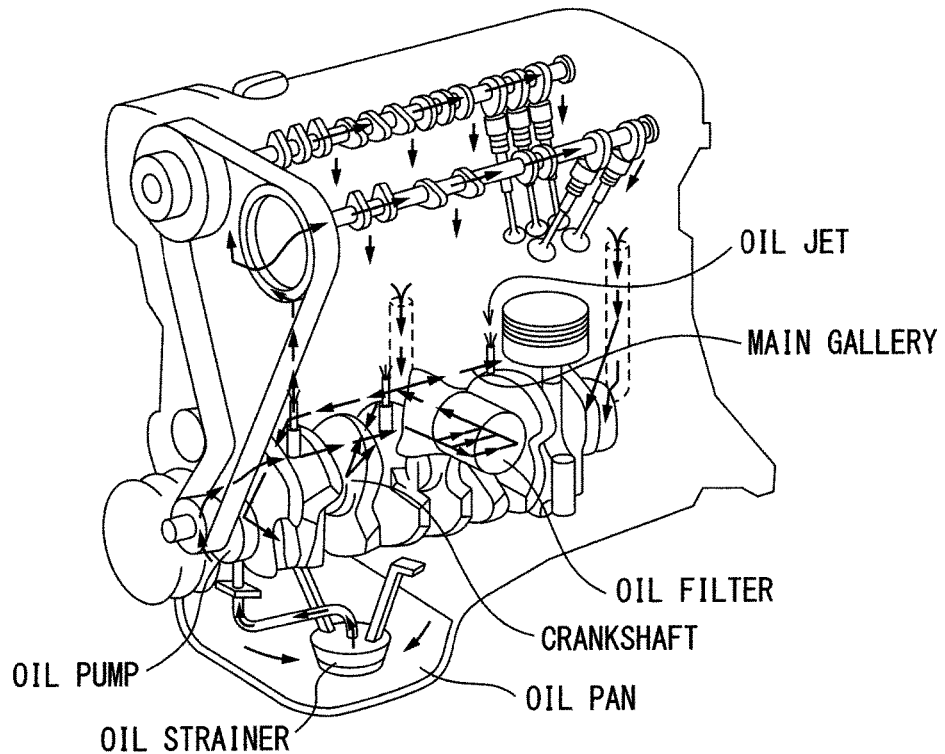
FIG. 1 is a view schematically showing a conventional lubrication system in an internal combustion engine.
Figure 1:
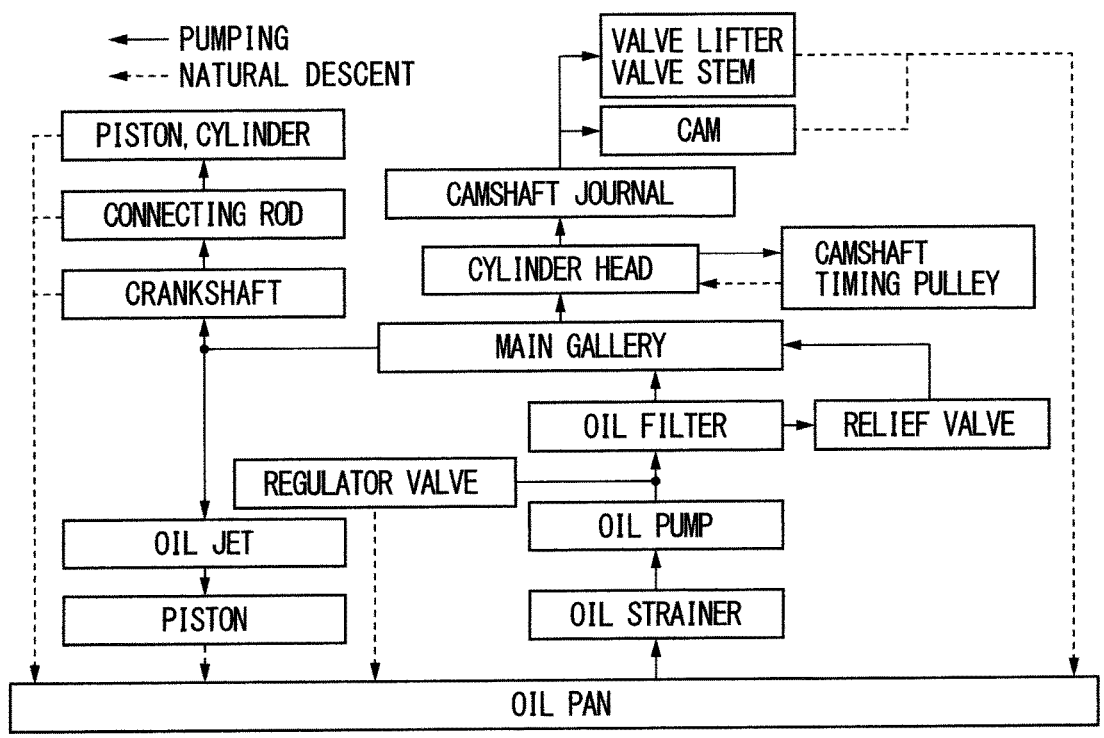

FIG. 1 is a view schematically showing a conventional lubrication system in an internal combustion engine. As shown in FIG. 1, the engine oil is stored in an oil pan provided under the engine, is pumped up through an oil strainer by the oil pump, then is filtered by the oil filter and is pumped to the main gallery. Further, the engine oil is supplied from the main gallery to the different lubricated parts of the engine. The engine oil circulated through the lubricated parts of the engine finally is returned to the oil pan.

As explained previously, the engine oil circulated through the lubricated parts of the engine contains foreign matter such as impurities. To remove this foreign matter, as shown in FIG. 1, an oil filter is provided in the oil path into which the engine oil flows. However, in a conventional oil filter such as a spin-on type or cartridge type oil filter comprising a filter member made of a filter paper, etc., housed in a casing, while it is possible to remove relatively large foreign matter, for example, foreign matter such as abrasion dust, there is the problem that smaller foreign matter, for example, foreign matter such as soot ingredients (burned hydrocarbons and oxide products) or sludge ingredients cannot be sufficiently removed. Soot ingredients and sludge ingredients not only lead to deterioration of the oil, but are also liable to have various detrimental effects on the different parts of the engine such as clogging of the oil path and abrasion of the engine sliding parts.

On the other hand, engine oil contains not only the foreign matter such as the abrasion dust and soot ingredients, but also various additive ingredients for securing the performance of the engine oil. For example, it is generally known that engine oil contains a viscosity index improver such as polymethacrylate (PMA)-based compounds, olefin copolymer (OCP)-based compounds, polyisobutylene (PIB)-based compounds, and styrene/isoprene (SCP)-based compounds, in order to reduce changes in the viscosity of the engine oil accompanying changes in temperature.

In recent years, there is a demand for reducing an amount of an organic molybdenum compound such as molybdenum dithiocarbamate (MoDTC) used as an abrasion reduction agent in engine oil from the viewpoint of protecting the environment. On the other hand, from the viewpoint of securing the reliability of abrasion resistance by the engine oil, there is a demand for improving the high temperature high shear viscosity (HTHS viscosity) of the engine oil. Therefore, a viscosity index improver such as polymethacrylate (PMA) can be said to be an extremely important additive ingredient in securing or maintaining the performance of engine oil.

For example, if a finer oil filter is used instead of a conventional oil filter or in addition to it so as to remove the soot ingredients etc., which are relatively small foreign matter contained in engine oil, not only the soot ingredients etc., contained in the engine oil, but also the viscosity index improver is liable to be removed. In this case, there is a possibility of the performance of the engine oil no longer being able to be maintained in a high state. Therefore, to suppress deterioration of engine oil due to contamination by foreign matter while maintaining the performance of the engine oil by the additive ingredients, it is necessary to use an oil filter which enables additive ingredients such as the viscosity index improver to pass through it while enabling foreign matter such as the abrasion dust and soot ingredients to be selectively removed.

Even if a filter made of a resin having a smaller pore size used, for example, in the field of medicine, etc., is used instead of a conventional oil filter or in addition to it, it is extremely difficult for such a filter to remove abrasion dust and/or soot ingredients, etc., or selectively remove them. The reason is that such a filter has a large variation in pore size with generally a normal distribution with a large dispersion, and therefore it is difficult to reliably remove specific ingredients in the engine oil, in particular the soot ingredients, etc. Further, even if it were possible to remove the soot ingredients, etc., additive ingredients such as the viscosity index improver would be liable to be removed simultaneously. Further, such a filter made of a resin also has the problem of the pore size changing due to heat expansion of the component material, etc.

Therefore, the present inventors have taken note of and studied ceramic materials which have much smaller coefficients of heat expansion compared with materials such as resins and which are relatively easy to control in pore size. As a result, the present inventors have found that by using,
in addition to a conventional oil filter (a first oil filter), an additional oil filter (a second oil filter) comprising a second filter member made of such a ceramic material and having a mean pore size smaller than the mean pore size of the first filter member in the conventional oil filter, it is possible to reliably remove relatively small foreign matter, in particular foreign matter such as soot ingredients, which could not be sufficiently removed by the conventional oil filter, without being greatly affected by temperature, and therefore possible to remarkably suppress deterioration of the oil used in an internal combustion engine.

Further, the present inventors have found that by controlling the mean pore size of the second filter member to a specific range, for example, a range of greater than 0.1 µm but less than 1 µm, in particular 0.2 µm or more but 0.5 µm or less, it is possible to pass additive ingredients such as the viscosity index improver through the second oil filter, while selectively removing foreign matter such as the abrasion dust or soot ingredients. In addition, the present inventors have found that by using the second oil filter, not only is it possible to suppress deterioration of the oil, but the second oil filter can maintain the performance in removing soot ingredients, etc., even for oil which has deteriorated to a certain advanced stage, and therefore can exhibit high durability.

[First Oil Filter]

According to the present invention, as the first oil filter, it is possible to use any oil filter comprising a first filter member for filtering oil from an oil pan in which the oil is stored and having a mean pore size larger than the mean pore size of the second filter member in the second oil filter explained below. Preferably, the first oil filter may include, but is not particularly limited to, an oil filter comprising a first filter member made of a material different from a ceramic material, in particular a first filter member consisting of a filter paper or a nonwoven fabric. More particularly, the first oil filter may include a conventionally known oil filter such as a spin-on type or cartridge type oil filter comprising a first filter member made of a filter paper or nonwoven fabric housed in a casing. The filter member made of a filter paper or nonwoven fabric used in such a conventionally known oil filter has a pore size of generally about 18 µm. Therefore, by using such an oil filter as the first oil filter in the present invention, it is possible to reliably remove relatively large foreign matter, for example, foreign matter such as abrasion dust.

[Second Oil Filter]

According to the present invention, a second oil filter is used in combination with the first oil filter. The second oil filter comprises a second filter member made of a ceramic material for filtering the oil from the oil pan in which the oil is stored. The second filter member has a mean pore size smaller than the mean pore size of the first filter member in the first oil filter. By using such an oil filter in combination with the first oil filter, it is possible to reliably remove relatively small foreign matter which cannot be sufficiently removed by the first oil filter.

It is known that a ceramic material is a material having an extremely small coefficient of heat expansion, compared with other materials, for example, a metal and resin, etc. Further, using a ceramic material makes it possible to easily manufacture a filter material with a pore size controlled to a predetermined value or range, compared with a filter material made of fiber or hollow fiber as used in technical fields different from this technical field. In other words, a filter material made of fiber or hollow fiber has a large variation in pore size with generally a normal distribution with a large dispersion, while using a ceramic material makes it possible to obtain a filter material having an extremely sharp distribution of pore size.

Therefore, using the ceramic material makes it possible to produce an oil filter comprising a filter member with a small change in pore size (i.e., small enlargement and/or shrinkage) due to changes in temperature and with a pore size controlled to a predetermined value or range, compared with the case of using other materials. Therefore, by using such an oil filter in combination with a conventional oil filter, not only is it possible to reliably remove relative small foreign matter which cannot be sufficiently removed by the conventional oil filter, but also it is possible to selectively remove such foreign matter relative to the various additive ingredients in the oil.

According to the present invention, the mean pore size of the second filter member made of the ceramic material may be suitably determined in accordance with the size etc., of the impurities or foreign matter to be removed in the oil. While not particularly limited, in general, the second filter member made of the ceramic material preferably has a mean pore size of greater than 0 µm but less than 5 µm.

When the second filter member made of the ceramic material has a mean pore size of 5 µm or more, the relatively small foreign matter in the oil, in particular the soot ingredients and/or sludge ingredients, may fail to be sufficiently removed. On the other hand, when the second filter member has an extremely small mean pore size, for example a mean pore size of 0.1 µm or less, the second filter member is liable to clogged. Further, various additive ingredients contained in the oil, for example, a viscosity index improver such as PMA may be removed. Therefore, in order to pass such additive ingredients while sufficiently removing the relatively small foreign matter in the oil, in particular the soot ingredients and/or sludge ingredients, the second filter member made of the ceramic material has more preferably a mean pore size of greater than 0.1 µm but less than 1 µm, most preferably 0.2 µm or more but 0.5 µm or less.

As the viscosity index improver, as previously described, in addition to PMA as well, OCP, PIB, etc., can be used. These viscosity index improvers generally have equal volumes. Therefore, for example, even if viscosity index improvers other than PMA are used, by controlling the mean pore size of the second filter member made of the ceramic material to the above range, it is possible to selectively remove the soot ingredients etc., relative to these viscosity index improvers in the same way as the case of use of PMA.

Unless otherwise indicated, the term "mean pore size" in the present invention refers to the arithmetic average of measured values when the second filter member is measured using an electron microscope such as transmission electron microscope (TEM) and scanning electron microscope (SEM), and randomly selected 100 or more pores are measured for the size in a fixed direction. In particular, the term "mean pore size" in the present invention refers to the arithmetic average of the pore sizes in the direction of flow of oil of randomly selected 100 or more pores when a cut cross-section of the second filter member cut along the direction of flow of oil is measured by using an electron microscope such as transmission electron microscope (TEM) and scanning electron microscope (SEM).

[Preferable Aspect of Second Oil Filter]

The second oil filter may be any oil filter comprising the above second filter member made of the ceramic material, and may include oil filters having various configurations. Therefore, while not particularly limited, for example, the second oil filter is preferably comprised of a honeycomb structure which comprises a plurality of cell passages which are defined by partition walls and which oil flows into, and which is made of a ceramic material, wherein the partition walls comprise the second filter member.

The term "honeycomb structure" in the present invention includes any structure comprising a plurality of cell passages which are defined by partition walls. Further, the cross-sectional shape of the cell passages in the honeycomb structure is not particularly limited. A square shape, hexagonal shape, other polygonal shape, a circular shape, etc., or any other shape can be suitably selected.

Figure 2:
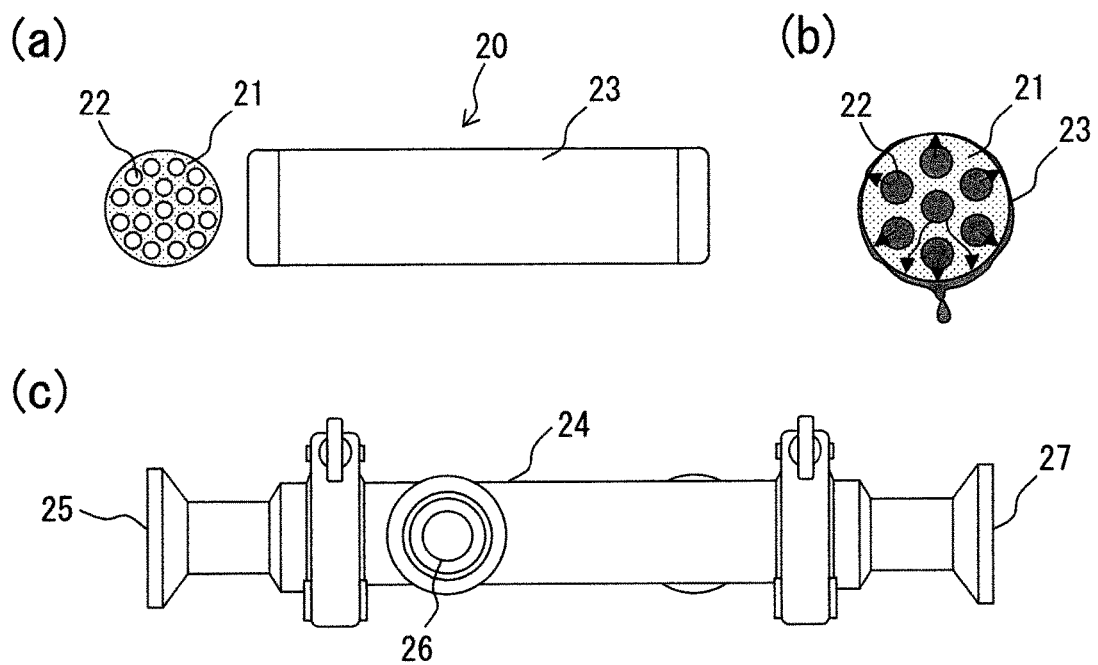
FIG. 2 is a view showing one example of a second oil filter used in an oil deterioration suppressing apparatus for an internal combustion engine of the present invention.

FIG. 2 is a view showing one example of a second oil filter used in the oil deterioration suppressing apparatus for an internal combustion engine of the present invention. Specifically, FIG. 2(a) shows a second oil filter 20, FIG. 2(b) is a conceptual view for explaining a filtration mechanism of oil by the second oil filter 20, and FIG. 2(c) is a view showing a state where the second oil filter 20 is housed in a casing 24.

Referring to FIG. 2(a), the second oil filter 20 is comprised of a honeycomb structure 23 comprising a plurality of cell passages 22 defined by the partition walls 21. The honeycomb structure 23 is made of a ceramic material, while partition walls 21 comprise the second filter member made of the ceramic material. For example, the partition wall 21 may be configured by only the second filter member, may be configured by mainly the second filter member, or may be configured at least partially by the second filter member.

This second oil filter 20 is generally used in a form housed in the casing 24 as shown in FIG. 2(c). Specifically explaining the filtration of oil which uses such a second oil filter 20, the oil first flows into an oil inlet part 25 of the casing 24, then flows from the cell passages 22 of the honeycomb structure 23 housed in the casing 24 to the inside of the honeycomb structure 23. Next, the inflowing oil is filtered by passing through the partition walls 21 comprising the second filter member having the predetermined mean pore size from the inside toward the outside of the honeycomb structure 23, as shown in FIG. 2(b), lastly the filtered oil is discharged from the outer circumferential part of the honeycomb structure 23 through the filtered oil exit part 26 of the casing 24 to the outside.

As the honeycomb structure 23, it is possible to employ a configuration in which both end parts of the cell passages 22 are opened. Alternatively, as the honeycomb structure 23, it is possible to employ a configuration in which cell passage 22 having one end part opened and the other end part sealed and another cell passage 22 having one end part sealed and the other end part opened are alternately arranged, as is generally known in a diesel particulate filter (DPF), etc. However, taking into consideration the washing, etc., when the honeycomb structure 23 clogs, as the honeycomb structure 23, it is preferable to employ a configuration in which both end parts of the cell passages 22 are opened.

More specifically explaining, when using the second oil filter 20 to filter oil, soot ingredients, etc., may build up on the second filter member in the partition walls 21 along with the elapse of time, and finally the second oil filter 20 may clog. However, in a honeycomb structure 23 with both end parts of the cell passages 22 opened, even in such a case, for example, it is possible to run oil from the oil inlet part 25 to the oil exit part 27 of the casing 24 shown in FIG. 2(c) for a predetermined time so as to suitably remove the soot ingredients, etc., built up on the second filter member in the partition walls 21. As a result, it is possible to solve the problem of clogging of the second oil filter 20 relatively easily.

Partition walls 21 in the honeycomb structure 23 comprise the second filter member made of the ceramic material, as explained above. Preferably, the partition walls 21 in the honeycomb structure 23 have a multilayer structure, and the second filter member forms the surface layer of the multilayer structure at the oil inflow side. By configuration in this way, even if the soot ingredients and/or sludge ingredients deposit on the second filter member in the partition walls 21 resulting in clogging along with the elapse of time, since the soot ingredients, etc., build up on the surfaces of the cell passages 22, it is possible to suitably remove the soot ingredients, etc., and relatively easily eliminate clogging of the second oil filter 20 by running oil from the oil inlet part 25 to the oil exit part 27 of the casing 24 for a predetermined time as described above.

More preferably, partition walls 21 in the honeycomb structure 23 have a multilayer structure, the second filter member forms the surface layer of the multilayer structure at the oil inflow side, and the honeycomb structure is configured so that the mean pore sizes of the layers of the multilayer structure gradually increase from the oil inflow side toward the oil outflow side of the multilayer structure. For example, the case where the partition walls 21 in the honeycomb structure 23 have a three-layer multilayer structure will be explained in detail below.

Figure 3:
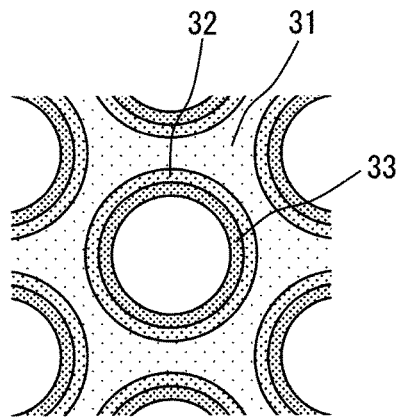
FIG. 3 is a schematic view showing a preferable aspect of the honeycomb structure used in the second oil filter.

FIG. 3 is a schematic view showing a preferable aspect of the honeycomb structure used in the second oil filter.

Referring to FIG. 3, partition walls in the honeycomb structure have a multilayer structure of three layers consisting of a base layer 31 at an oil outflow side, an intermediate layer 32, and a surface layer 33 at an oil inflow side. The surface layer 33 is comprised of the second filter member made of the ceramic material. In a preferable aspect of the present invention, the layers are arranged so that the mean pore sizes of the layers gradually increase from the oil inflow side toward the oil outflow side. If explained in relation to FIG. 3, the surface layer 33 has the smallest mean pore size, the intermediate layer 32 has a mean pore size larger than the mean pore size of the surface layer 33, and the base layer 31 has the largest mean pore size. By making the partition walls in the honeycomb structure such a multilayer structure, it is possible to utilize capillary action to promote filtration of the oil.

The honeycomb structure comprising partition walls having such a multilayer structure can be produced by any method known to a person skilled in the art. For example, first, the intermediate layer 32 is formed by coating the surface of the ceramic porous base member constituting the base layer 31 with a slurry containing ceramic powders having a predetermined particle size and a binder, etc., optionally followed by a heat treatment, etc. Next, the surface layer 33 is formed by coating the surface of the intermediate layer 32 with a slurry containing ceramic powders having a particle size smaller than that of the ceramic powders used to form the intermediate layer 32 and a binder, etc., similarly followed by a heat treatment, etc. By such a method, it is possible to produce a honeycomb structure comprising partition walls having a multilayer structure wherein the mean pore sizes of the layers of the multilayer structure gradually increase from the oil inflow side toward the oil outflow side. The base layer 31, intermediate layer 32 and surface layer 33 may be formed by the same ceramic material, or may be formed by different ceramic materials.

The ceramic material, which forms the second filter member or the honeycomb structure in the present invention, may be any ceramic material, for example, a ceramic material which forms a honeycomb substrate generally used in exhaust gas purification catalysts, diesel particulate filters (DPF), etc. While not particularly limited, for example, the ceramic material which forms the second filter member or the honeycomb structure is selected from the group consisting of cordierite ($2MgO.2Al_2O_3.5SiO_2$), silicon carbide (SiC), alumina ($Al_2O_3$), zirconia ($ZrO_2$), titania ($TiO_2$), and combinations thereof. From the viewpoint of the heat resistance and strength, the ceramic material which forms the second filter member or the honeycomb structure is preferably selected from the group consisting of cordierite ($2MgO.2Al_2O_3.5SiO_2$), silicon carbide (SiC), and combinations thereof.

[Embodiment of Oil Deterioration Suppressing Apparatus]

According to one embodiment of the present invention, the first oil filter is preferably used as a full flow filter which is connected to the downstream side of the oil pan, in which the oil is stored, in oil flow and the upstream side of the lubricated parts of the internal combustion engine in oil flow and which filters the oil supplied to the lubricated parts of the internal combustion engine. Further, the oil deterioration suppressing apparatus for an internal combustion engine preferably has a bypass route which is branched off at the upstream side or downstream side of the first oil filter in the oil flow direction and communicates with the oil pan, and the second oil filter is used as a bypass filter which is placed in the bypass route and filters oil toward the oil pan.

Figure 4:
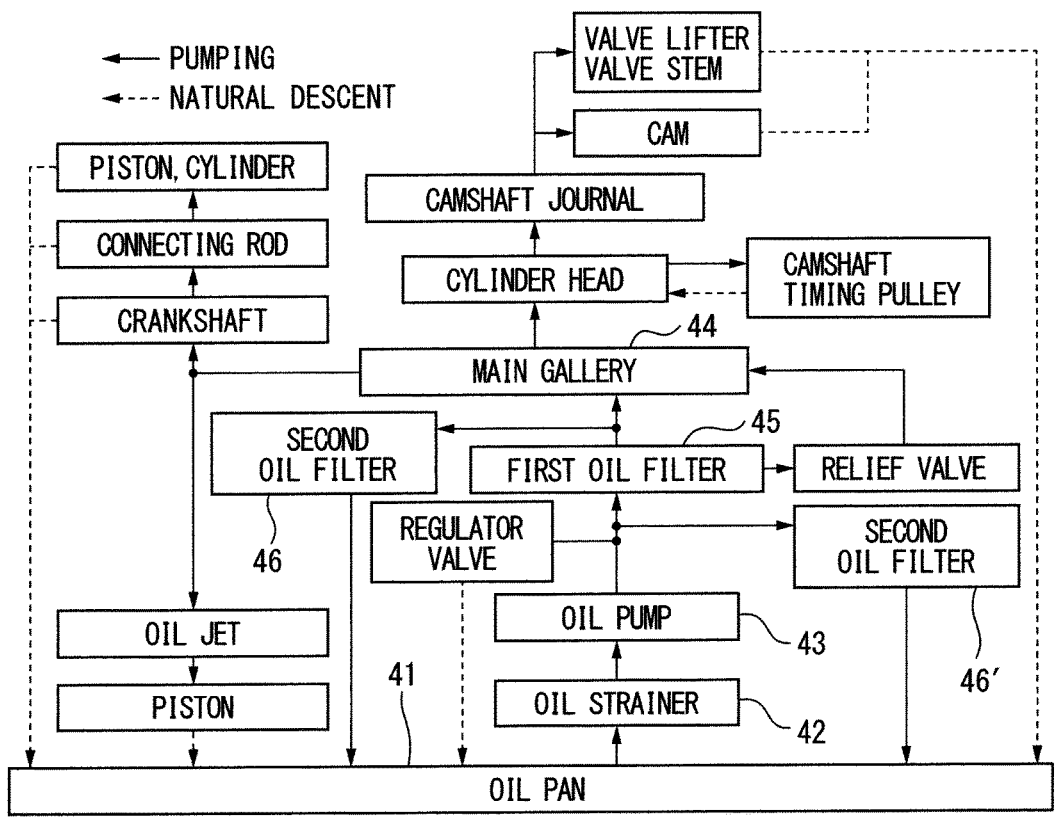
FIG. 4 is a schematic view showing an embodiment of an oil deterioration suppressing apparatus for an internal combustion engine according to the present invention.

FIG. 4 is a schematic view showing an embodiment of an oil deterioration suppressing apparatus for an internal combustion engine according to the present invention. Referring to FIG. 4, a first oil filter 45 is used as a full flow filter. More specifically, all of the oil stored in the oil pan 41 is filtered by the first oil filter 45 after passing through an oil strainer 42 and an oil pump 43 and before being supplied to the different lubricated parts of the engine through a main gallery 44. By doing this, it is possible to use the first oil filter 45 to reliably remove foreign matter such as abrasion dust liable to cause problems in the engine before supplying the oil to the lubricated parts of the engine.

On the other hand, a second oil filter 46 or 46' is placed in a bypass route at the downstream side or upstream side of the first oil filter 45 in the oil flow direction and is used as a bypass filter for filtering the oil toward the oil pan 41. The second oil filter 46 or 46' in the present invention is smaller in the mean pore size of the filter member, compared with the first oil filter 45 as explained above. Therefore, when using the second oil filter 46 or 46' as a full flow filter in the same way as the first oil filter 45, the pressure of all of the oil is concentrated at the second oil filter 46 or 46', and the required flow rate sometimes cannot be secured.

For this reason, by using the second oil filter 46 or 46' not to filter the oil supplied to the lubricated parts of the engine, but as a bypass filter for filtering the oil toward the oil pan 41 as shown in FIG. 4, it is possible to take the time to reliably remove the relatively small foreign matter which cannot be removed by the first oil filter 45 of the full flow filter. Further, by using the second oil filter 46 or 46' as a bypass filter, there is no restriction of the flow rate or other limitations, so it is possible to suitably design the mean pore size of the filter member in accordance with the impurities or foreign matter to be removed. As a result, it is possible to produce an oil filter with extremely high filtration performance.

The second oil filter may be placed in any bypass route which is branched off at the downstream side or upstream side of the first oil filter 45 in the oil flow direction, as shown by reference numeral 46 or 46' in FIG. 4. While not particularly limited, the second oil filter is preferably placed in the bypass route which is branched off at the downstream side of the first oil filter 45 in the oil flow direction as shown by reference numeral 46 in FIG. 4. By doing this, after the larger foreign matter in the oil is removed by the first oil filter 45, the second oil filter 46 is used for filtration. Therefore, the lifetime of the second oil filter 46 can be extended, compared with the case of placement in a bypass route which is branched off at the upstream side of the first oil filter 45 in the oil flow direction.

The oil deterioration suppressing apparatus according to the present invention can be applied to either an internal combustion engine of a gasoline engine and diesel engine.

Below, the oil deterioration suppressing apparatus for an internal combustion engine of the present invention will be explained in detail based on experimental findings.

A conventional oil filter comprising a filter member made of a filter paper housed in a casing was used as a first oil filter. On the other hand, an oil filter comprising a silicon carbide (SiC) honeycomb structure housed in a casing, wherein the honeycomb structure comprises a plurality of cell passages defined by partition walls having a three-layer multilayer structure, was used as a second oil filter. The honeycomb structure is one where the mean pore sizes of the layers in the multilayer structure gradually increases from the oil inflow side toward the oil outflow side of the multilayer structure, and where the surface layer of the oil inflow side in that multilayer structure has a mean pore size of 0.1 µm to 5 µm as shown in following Table 1.

TABLE 1

Honeycomb Structure Used in Second Oil Filter

| No. | Mean pore size of surface layer (µm) |
|---|---|
| 1 | 0.1 |
| 2 | 0.2 |
| 3 | 0.5 |
| 4 | 1 |
| 5 | 5 |

[Evaluation 1 of Removal Performance]

The oil deterioration suppressing apparatus combining the first oil filter and the second oil filter was evaluated for performance in removing foreign matter contained in oil. The experiment was performed using the evaluation system shown in FIG. 5.

Figure 5:
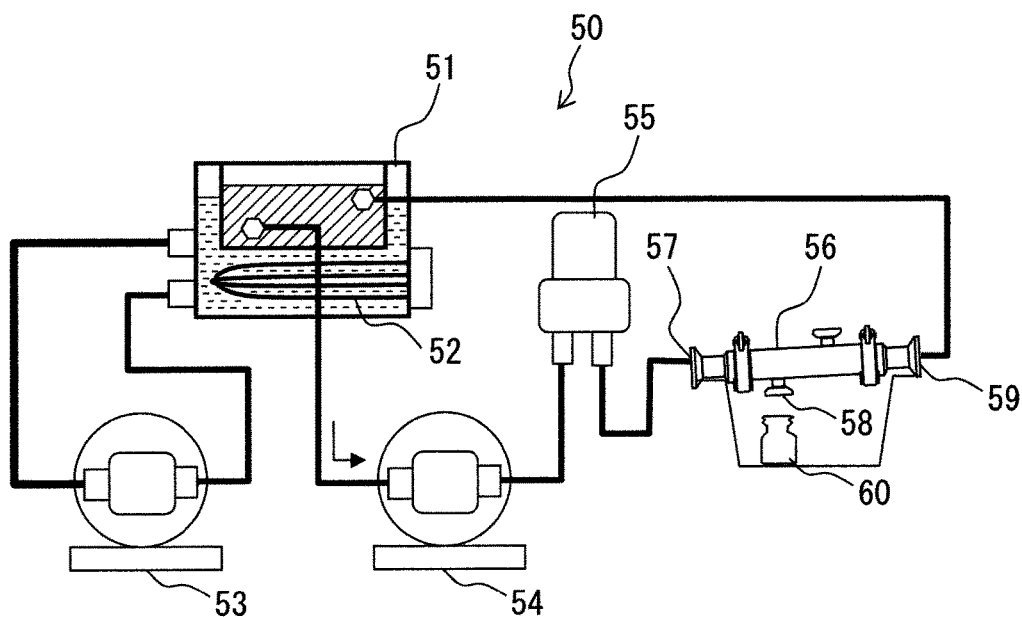
FIG. 5 is a view schematically showing an evaluation system for an oil deterioration suppressing apparatus which combines a first oil filter and a second oil filter.

Referring to FIG. 5, the evaluation system 50 is provided with an oil bath 51 for heating the engine oil to a predetermined temperature. The oil bath 51 is provided with a pipe heater 52. The oil bath 51 is connected to a silicone oil circulating pump 53 for circulating the silicone oil used in the oil bath. Further, the oil bath 51 is connected through an engine oil circulating pump 54 to an oil inlet part of a first oil filter 55. Further, the oil exit part of the first oil filter 55 is connected to the oil inlet part 57 of the second oil filter 56, the filtered oil exit part 58 of the second oil filter 56 is provided with a polyethylene (PE) container 60, and the oil filtered by the second oil filter 56 is stored in the PE container 60.

On the other hand, another oil exit part 59 of the second oil filter 56 is connected to the oil bath 51. Therefore, if the second oil filter 56 clogs, it is possible to run engine oil from the oil inlet part 57 to the oil exit part 59 of the second oil filter 56 to eliminate such clogging.

The above evaluation system 50 was used for a filtration test of deteriorated oil containing a predetermined amount of particulate matter (PM) for the cases of using second oil filters constituted by honeycomb structures with surface layers having mean pore sizes of 0.1 µm, 0.2 µm, and 0.5 µm. The test time was 8 hours. The results are shown in following Table 2.

TABLE 2

PM Removal Performance

| Mean pore size of surface layer (µm) | PM removal rate |
|---|---|
| 0.1 | About 95% |
| 0.2 | About 95% |
| 0.5 | About 90% |

As clear from the results shown in Table 2, an extremely high PM removal rate could be achieved in all of the second oil filters.

[Evaluation 2 of Removal Performance]

Next, a similar evaluation system was used to conduct a filtration test for deteriorated oil containing about 2500 ppmw of sludge ingredients for the case of using second oil filters constituted by honeycomb structures with surface layers having mean pore sizes of 0.1 µm to 5 µm. The results are shown in FIG. 6.

Figure 6:
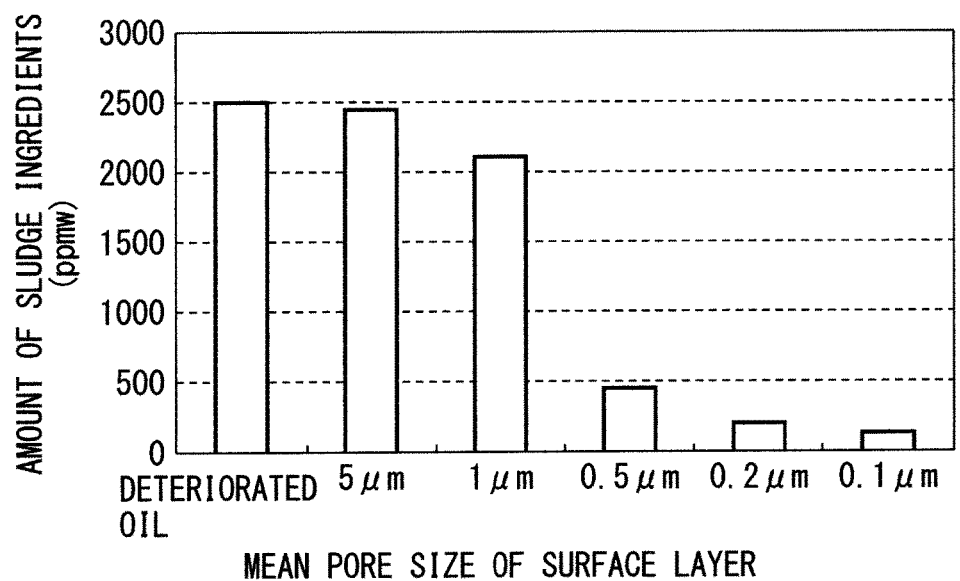
FIG. 6 is a view showing the results of a filtration test of deteriorated oil relating to the case of using second oil filters constituted by honeycomb structures with surface layers having mean pore sizes of 0.1 µm to 5 µm.

FIG. 6 is a view showing the results of a filtration test of deteriorated oil relating to the case of using second oil filters constituted by honeycomb structures with surface layers having mean pore sizes of 0.1 µm to 5 µm. The ordinate of FIG. 6 indicates the amount of sludge ingredients (ppmw) contained in the filtered oil. To facilitate the comparison, the amount of sludge ingredients of the deteriorated oil itself used for the test is also shown in the figure.

Referring to FIG. 6, it will be understood that when using a second oil filter constituted by a honeycomb structure with a surface layer having a mean pore size of 5 µm, it was not possible to sufficiently remove the sludge ingredients in the deteriorated oil. However, by using a honeycomb structure with a surface layer having a smaller mean pore size, it was possible to remove the sludge ingredients in the deteriorated oil. For example, when using a honeycomb structure with a surface layer having a mean pore size of less than 1 µm, in particular 0.5 µm or less, it was possible to achieve a particularly remarkable performance in removing sludge ingredients.

[Evaluation of Selectivity]

Next, a similar evaluation system was used for a filtration test of oil containing a viscosity index improver constituted by a predetermined amount of polymethacrylate (PMA) for the cases of using second oil filters constituted by honeycomb structures with surface layers having mean pore sizes of 0.1 µm and 0.2 µm. The analysis was performed using gel permeation chromatography (GPC).

If comparing the results of GPC analysis, with oil containing PMA before passing through the second oil filter, the number average molecular weight and weight average molecular weight of PMA with a molecular weight of about 50,000 to about 250,000 were respectively about 128,000 and about 137,000, while with oil containing PMA in the case of using a second oil filter constituted by a honeycomb structure with a surface layer having a mean pore size of 0.2 µm, the number average molecular weight and weight average molecular weight of PMA with a molecular weight in the same range were respectively about 123,000 and about 132,000. In other words, when using a second oil filter constituted by a honeycomb structure with a surface layer having a mean pore size of 0.2 µm, no great difference could be seen in the results of analysis before and after passing through the second oil filter. Therefore, it can be seen that the PMA added to engine oil as a viscosity index improver passes through the second oil filter without being removed much at all.

On the other hand, with oil containing PMA in the case of using a second oil filter constituted by a honeycomb structure with a surface layer having a mean pore size of 0.1 µm, the number average molecular weight and weight average molecular weight of PMA with a molecular weight in the same range were respectively about 110,000 and about 118,000. A decreasing trend was seen compared with the results of oil containing PMA before passing through the second oil filter. Therefore, when using a second oil filter constituted by a honeycomb structure with a surface layer having a mean pore size of 0.1 µm, it is understood that PMA having a molecular weight of about 50,000 to 250,000 is partially removed by the second oil filter.

[Evaluation of Durability]

Finally, the second oil filter in the present invention was examined for removal performance when using oils with different degrees of deterioration. The results are shown in FIG. 7.

Figure 7:
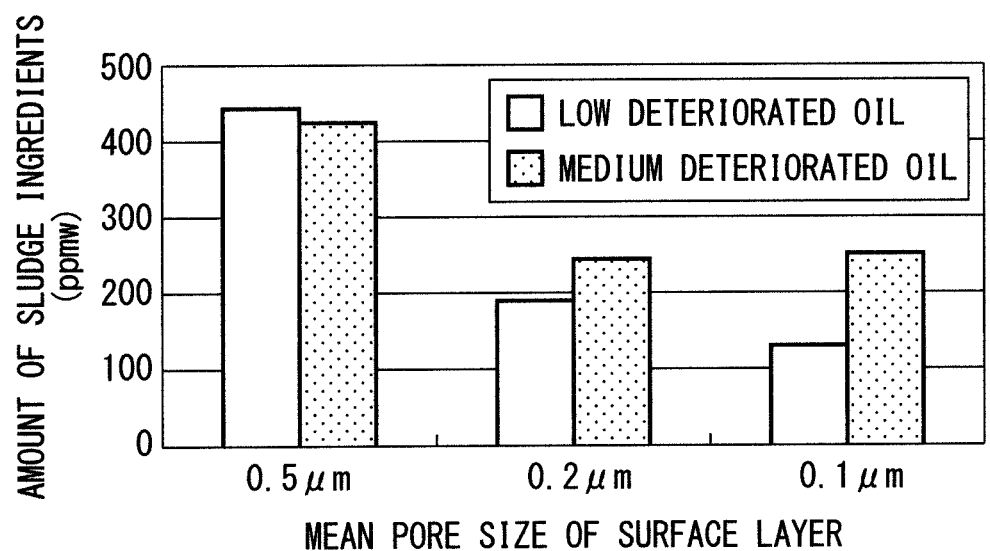
FIG. 7 is a view showing the results of a filtration test of oils differing in degree of deterioration relating to the case of using second oil filters constituted by honeycomb structures with surface layers having mean pore sizes of 0.1 µm, 0.2 µm, and 5 µm.

FIG. 7 is a view showing the results of a filtration test of oils differing in degree of deterioration relating to the case of using second oil filters constituted by honeycomb structures with surface layers having mean pore sizes of 0.1 µm, 0.2 µm, and 0.5 µm. In the figure, "low deteriorated oil" is deteriorated oil corresponding to oil after a car is driven about 7500 km, while "medium deteriorated oil" is deteriorated oil corresponding to oil after a car is driven about 15000 km. From the results of FIG. 7, it has been found that it is possible to maintain the performance in removing sludge ingredients in all of the second oil filters used even for oil which has deteriorated to a certain advanced stage.

DESCRIPTION OF REFERENCE NUMERALS

- 20: Second oil filter
- 21: Partition wall
- 22: Cell passage
- 23: Honeycomb structure
- 24: Casing
- 25: Oil inlet part
- 26: Filtered oil exit part
- 27: Oil exit part
- 41: Oil pan
- 42: Oil strainer
- 43: Oil pump
- 44: Main gallery
- 45: First oil filter
- 46, 46': Second oil filter

The invention claimed is:

1. An oil deterioration suppressing apparatus for an internal combustion engine, comprising a first oil filter and a second oil filter, wherein the first oil filter comprises a first filter member for filtering oil from an oil pan in which oil is stored, and the second oil filter comprises a second filter member for filtering oil from the oil pan, and wherein the second filter member is made of a ceramic material and has a mean pore size smaller than the mean pore size of the first filter member,
wherein the first oil filter is a full flow filter which is connected to a downstream side of the oil pan in oil flow and an upstream side of lubricated parts of the internal combustion engine in oil flow and which filters the oil supplied to the lubricated parts of the internal combustion engine, and wherein the oil deterioration suppressing apparatus has a bypass route which is branched off at an upstream side or downstream side of the first oil filter in the oil flow direction and communicates with the oil pan, and the second oil filter is a bypass filter which is placed in the bypass route and filters the oil toward the oil pan.

2. The oil deterioration suppressing apparatus for an internal combustion engine as claimed in claim 1, wherein the first filter member is made of a material different from a ceramic material.

3. The oil deterioration suppressing apparatus for an internal combustion engine as claimed in claim 1, wherein the second filter member has a mean pore size of greater than 0.1 µm but less than 1 µm.

4. The oil deterioration suppressing apparatus for an internal combustion engine as claimed in claim 3, wherein the second filter member has a mean pore size of 0.2 µm or more but 0.5 µm or less.

5. The oil deterioration suppressing apparatus for an internal combustion engine as claimed in claim 1, wherein the oil deterioration suppressing apparatus has a bypass route which is branched off at a downstream side of the first oil filter in the oil flow direction and communicates with the oil pan.

6. The oil deterioration suppressing apparatus for an internal combustion engine as claimed in claim 1, wherein the second oil filter is comprised of a honeycomb structure wherein the honeycomb structure comprises a plurality of cell passages which are defined by partition walls and which oil flows into, and is made of a ceramic material, and wherein the partition walls comprise the second filter member.

7. The oil deterioration suppressing apparatus for an internal combustion engine as claimed in claim 6, wherein the partition walls have a multilayer structure, and the second filter member forms a surface layer of the multilayer structure at the oil inflow side.

8. The oil deterioration suppressing apparatus for an internal combustion engine as claimed in claim 7, wherein the mean pore sizes of the layers of the multilayer structure gradually increase from an oil inflow side toward an oil outflow side of the multilayer structure.

9. The oil deterioration suppressing apparatus for an internal combustion as claimed in claim 1, wherein the ceramic material is selected from the group consisting of cordierite, silicon carbide, alumina, zirconia, titania, and combinations thereof.

10. The oil deterioration suppressing apparatus for an internal combustion engine as claimed in claim 1, wherein the first filter member consists of a filter paper or a nonwoven fabric.

* * * * *